Patented Dec. 31, 1929

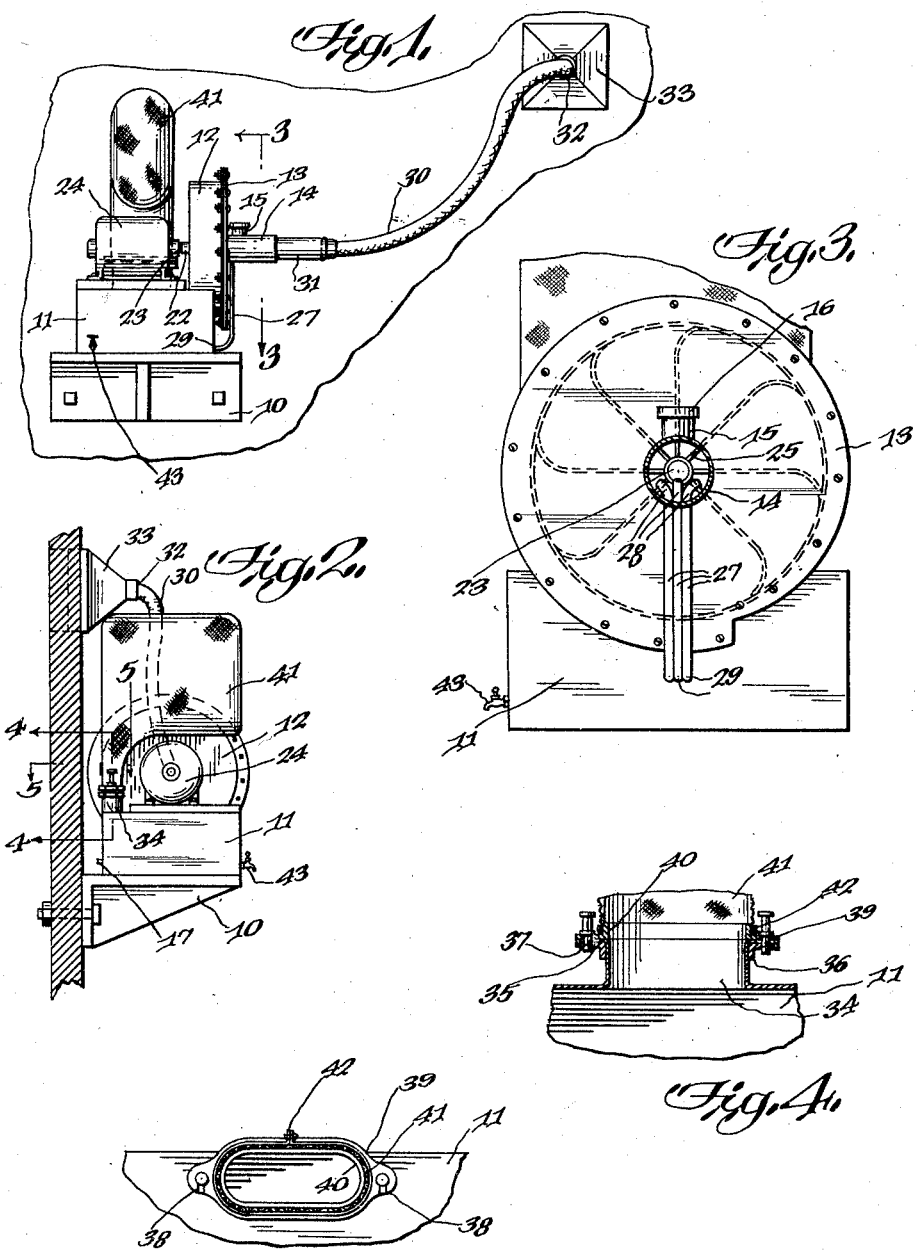

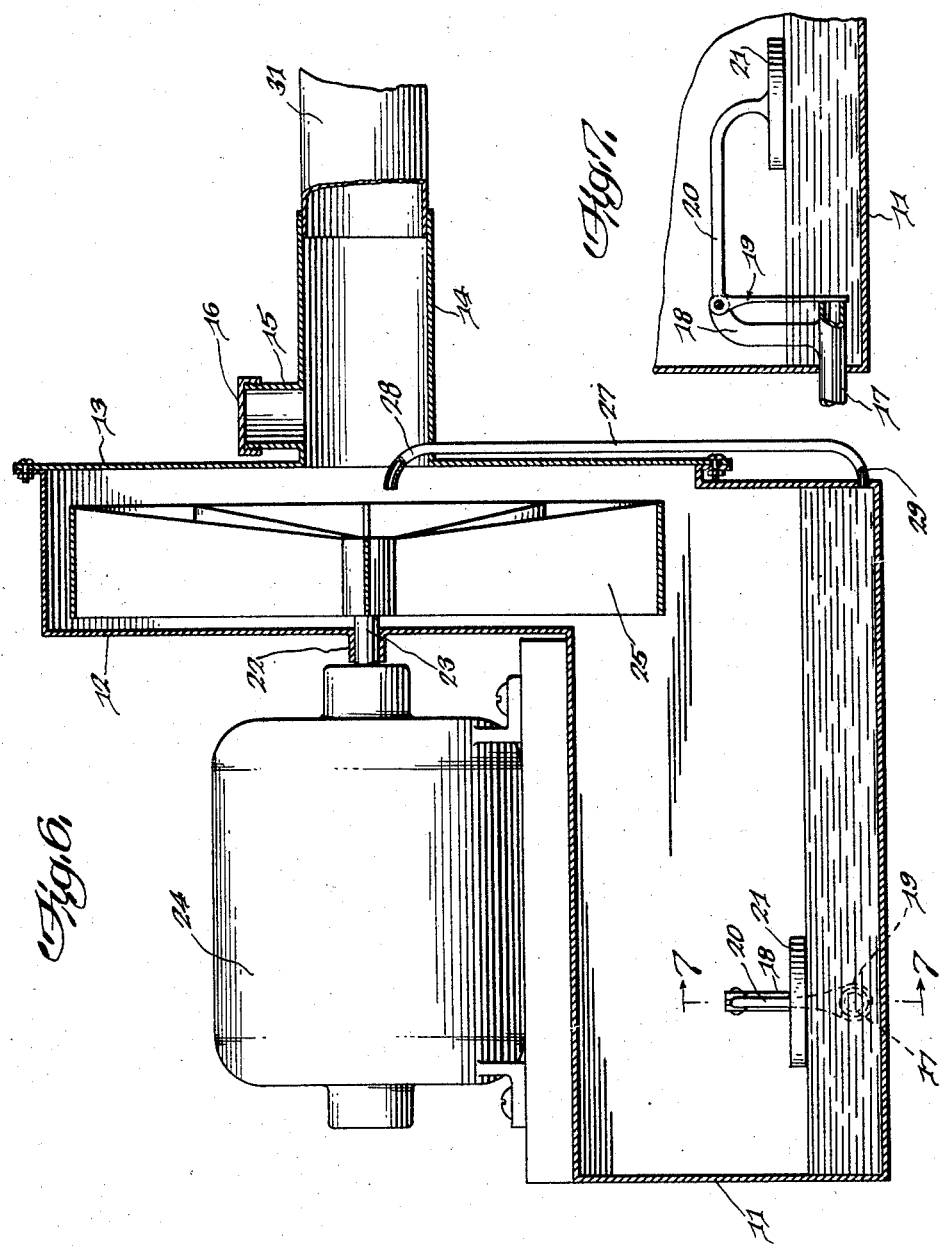

1,742,034

UNITED STATES PATENT OFFICE

YAICHI HAYAKAWA, OF CHICAGO, ILLINOIS

VENTILATOR

Application filed July 8, 1927. Serial No. 204,335.

This invention relates to certain novel improvements in ventilators.

One of the objects of my invention is to provide a ventilator particularly adapted to supply purified air to a room.

An object, ancillary to the foregoing, is to cool the air before admission to said room.

A further object of the invention is to provide such a device that will be compact in construction and readily transportable.

Other objects will appear hereinafter.

The invention consists in the novel combination and arrangement of parts to be hereinafter described and claimed.

The invention will be best understood by reference to the accompanying drawings, showing the preferred form of construction and in which:

Fig. 1 is a side elevational view of a preferred embodiment of my invention;

Fig. 2 is an end view of the embodiment of my invention illustrated on Fig. 1;

Fig. 3 is an elevational view taken substantially in the plane of the line 3—3 on Fig. 1;

Fig. 4 is a detail view taken substantially in the plane of the line 4—4 on Fig. 2;

Fig. 5 is a detail view taken substantially in the plane of the line 5—5 on Fig. 2;

Fig. 6 is a longitudinal sectional view of the device illustrated on Fig. 1; and Fig. 7 is a detail view taken substantially in the plane of the line 7—7 on Fig. 6.

Referring to the drawings wherein the preferred embodiment of my invention is illustrated, it may be seen that I provide a base 10 which may be arranged in any suitable manner and mounted on the upper side thereof is a container 11 in which a supply of water is adapted to be maintained. Provided at one end of the container 11 is an upwardly protruding housing 12, the interior of which is adapted to be in communication with the interior of the container 11. The housing 12 and the container 11 are arranged so as to embody an open side and a plate 13 having a helical configuration (best shown in Fig. 3) is adapted to close this open side. The plate 13 has a nozzle 14 formed thereon at the central portion thereof and an opening 15 is provided in the nozzle 14 which has a cap 16 adapted to be removably secured thereon.

In order to supply water to the air that will be moved through the container 11, a supply of water is maintained therein which is introduced into the device through the intake 15. Disposed within the container 11 is an over-flow pipe 17. A boss 18 is provided on the outlet pipe 12 and pivotally mounted thereon is a valve 19 which is adapted to control admission into the outlet pipe 17. Secured to the valve 19 is an arm 20 which carries a float 21 that is adapted to float on the quantity of water within the container 11. When the water level in the container 11 rises to a point above that shown in Fig. 7, the float is raised and therefore the valve 19 is moved from the front of the over-flow pipe 17 and the excess water flows out through this pipe which may be led to any suitable drain connection.

An opening 22 is provided in the wall of the housing 12 opposite the nozzle 14 and is disposed so as to be axially aligned with said nozzle. The shaft 23 of the motor 24 protrudes through this opening 22 and a suitable fan 25 is mounted on the motor shaft 23 within the housing 12. The motor 24 is suitably carried on the upper side of the container 11.

Disposed so as to extend along the front of the plate 13 exteriorly of the housing 12, are tubes 27 which have a portion 28 that protrudes through the nozzle 14 and which is bent toward the fan 25. The lower ends of the tubes 27 are directed into the container 11 as shown at 29 and are disposed so as to be below the level of the water therein.

A flexible tube 30 is provided and has a portion 31 that is adapted to be suitably secured to the nozzle 14 and is shown in Fig. 6. The end 32 of the flexible tube 30 extends through a suitable opening provided in the collecting member 33 which is adapted to be disposed so as to be in communication with the atmosphere exteriorly of the room in which the device being described is located.

Mounted on the upper side of the container 11 is an outlet passage 34 which embodies an outwardly protruding flange 35 at the upper end thereof. A suitably formed ring 36 is mounted on the outlet 34 contiguous of the flange 35 and has ears 37 thereon. Opens such as 38 are provided in the ring 36, and as can be seen by referring to Fig. 5, the openings 38 are slotted. A ring 39 is provided which embodies a configuration similar to the ring 36 and has an upwardly protruding portion 40 around which the lower end of the bag 41 is secured by means of the clamping member 42.

A suitable drain cock 43 is provided in order that the water may be withdrawn from the container 11 at desired times. Suitable connections are provided for the motor 24 which may be of any desired form which are not illustrated in the drawings.

The collecting member 33 is arranged in a wall of the room or at any other desired point, so as to be in communication with the atmosphere extraneous of said room. A suitable quantity of water is introduced into the container 11 and the motor 24 is connected to a suitable source of power and is caused to rotate. Air is then drawn in through the collecting member 33, the flexible tube 30, and the nozzle 14, by the fan 25 which will be caused to revolve by said motor. The air then travels through the container 11 in contact with the water therein and passes through the outlet passage 34 and is discharged into the room through the bag 41. The bag 41 is adapted to be of a porous construction, but will serve to restrain air passage therethrough sufficiently to build up a slight pressure in the container 11. This air pressure will aid the fan in drawing water through the tubes 27 and water conveyed therethrough will be mixed with the air in the region of the fan 25.

It is apparent that air travelling through the device will be mixed with the water and will be therefore purified and cooled before admission into the room.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claim.

Having thus described my invention what I claim as new and desire to protect by Letters Patent is:

A device of the class described including a housing providing a water containing compartment and having an opening provided at one of the upper corners thereof and including an upwardly extending hollow member around said opening having an open side, a closure member for said open side having a nozzle thereon at substantially the midpoint thereof, a motor mounted on the upper side of said housing including a shaft extending interiorly of said hollow member, a fan mounted on the portion of said shaft disposed interiorly of said hollow member, said container having another opening therein, a textile bag, means for removably mounting said textile bag over said last named opening whereby air discharged from said water containing compartment through said opening will have passage thereof resisted by said bag whereby a pressure will be built up in said bag and in said water containing compartment, said air being drawn through said nozzle and forced into said water containing compartment by said fan, and a conduit disposed exteriorly of said housing extended from said water containing compartment to said nozzle and having an end portion directed toward said fan whereby said fan may draw water through said conduit from said water containing compartment for inter-mixture with air drawn through said nozzle.

In testimony whereof I affix my signature.

YAICHI HAYAKAWA.